The UNITED STATES.

To all to whom these Presents shall come:—GREETING.

Whereas

Delivered to the within named
Daniel Henry this twenty ninth day of
January 1793.

G. Lewis Jr.